Aug. 30, 1932.　　　C. B. KITCHEN　　　1,874,760
BRAKE BAND EQUALIZER FOR AUTOMOBILES
Filed May 23, 1930
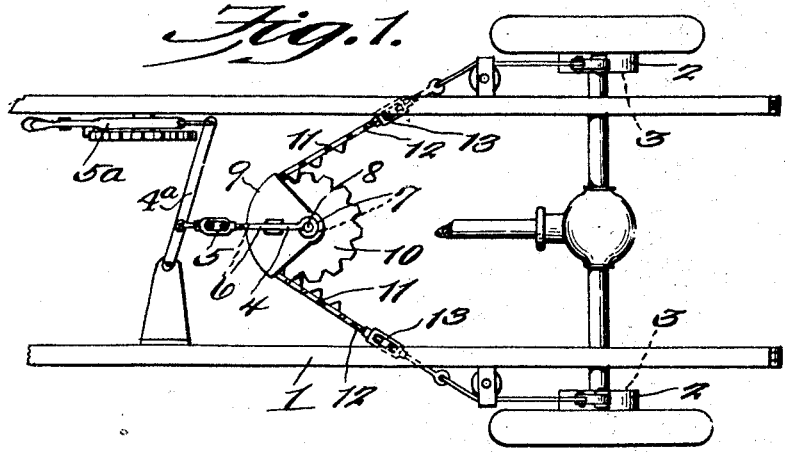
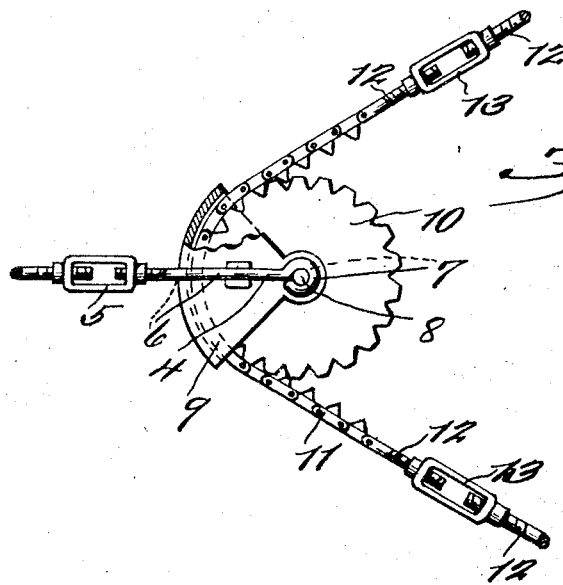
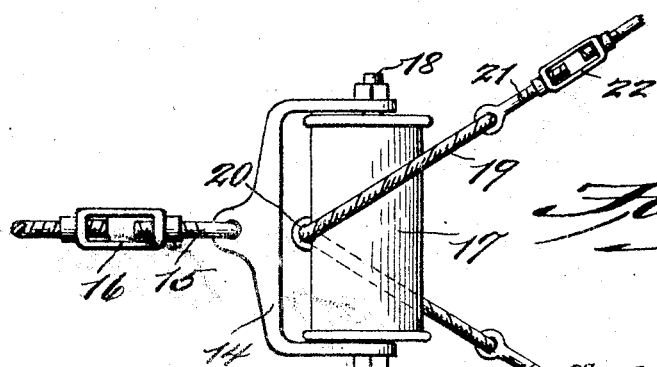
Charles B. Kitchen INVENTOR
BY Victor J. Evans
his ATTORNEY Patented Aug. 30, 1932

1,874,760

UNITED STATES PATENT OFFICE

CHARLES B. KITCHEN, OF NORTH GLENSIDE, PENNSYLVANIA

BRAKE BAND EQUALIZER FOR AUTOMOBILES

Application filed May 23, 1930. Serial No. 455,049.

The present invention relates to an improved brake band equalizer for automobiles, the purpose being to equalize the tension of the brake bands.

It is well known in automobiles that the brake bands are very often unequally tensioned and need adjusting, so that when applying the brakes, the band on one side will tension greater than the band on the opposite side, in which case the automobile will either skid or is very apt to swing sidewise, especially if the street or road is slippery, and possibly result in an accident against life or damage to the vehicle.

It is another purpose of the invention to provide an improved equalizing device, so that in case the brake bands have been tensioned unequal, the brake bands when applied will act with equal tension on the drums, and thereby prevent skidding or lateral swinging of the rear end of the vehicle.

Another purpose is to provide, in a brake equalizer of this character a toothed wheel supported in a hanger in the form of a shield for the wheel, in conjunction with a link connector to the source of power including a turn buckle for the purpose of adjusting the tension of the brake bands, the chain connecting upon opposite sides of the automobile with the brake bands, permitting the bands to apply to the drums with equal action.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1 is a view showing the preferred form of the invention as applied to a conventional or general type of motor vehicle.

Figure 2 is an enlarged view of the equalizer, more clearly showing the construction thereof.

Figure 3 is a view of a modified form.

Referring to the drawing, 1 identifies the frame of a conventional type of motor vehicle and 2 are the brake bands which usually cooperate with brake drums 3.

A link connector 4 is connected to a source of power, such as a brake lever 5a, the connector having a turn buckle 5, by the adjustment of which the connector can be lengthened or shortened and hence tensioning the device to suit the needs.

This connector comprises two arms 6, the eyes 7 of which being in turn connected to a spindle 8, which is mounted in bearings of a segmental housing or shield 9.

This shield or housing is fixed relative to the connector, while the spindle 8 is likewise fixed in the bearings of the shield or housing, so that the housing or shield will not oscillate relative to the connector.

A toothed wheel 10 is rotatably mounted on the spindle, and engaged about the wheel is a toothed chain 11. Connecting rods 12 are connected to the ends of the chain and in turn to the brake bands 2. These rods are in two sections as shown, the sections being joined by turn buckles 13.

Obviously if the brake bands are loose or unequally tensioned the turn buckles 5 and 13 can be adjusted for equally tightening or loosening the brake bands, since one rod 12 is connected to the brake band on one side of the automobile, while the other rod is connected to the brake band on the opposite side.

By means of this construction, the brake lever, when moved for applying the bands to the drums, the chain will accommodate itself to the rotation of the toothed wheel 10, and hence cause the chain to pull upon the bands with equal action, and thereby prevent skidding of the rear driving wheels and prevent lateral swinging of the vehicle.

In Figure 3 a modified construction is provided, in which a U-shaped connector 14 is used, having a rod 15 including a turn buckle 16, and which rod is in turn connected to a source of power such as a brake lever. A drum 17 is mounted on a transversely disposed spindle or axle 18 mounted in bearings of the arms of the connector 14.

A suitable cable 19 engages over the drum and is connected at 20 to the drum. The opposite ends of the cable are connected to rods 21 having turn buckles 22 and which rods are in turn adapted to connect with brake bands, (not shown). Obviously when the brake lever, as illustrated is operated a pulling action is imparted upon the connector 14 which in turn pulls upon the two ends of the drum, and due to the cable being connected to the brake bands equal action is imparted upon the bands and thereby acting to retard and at the same time equally brake the rear drive wheels of the vehicle.

The invention having been set forth, what is claimed is:

In a brake equalizer, the combination with brake bands of an automobile, of an oscillatory link with one end on a fixed pivot and its other end adapted to be connected to a brake lever, a single rocking element, a connection operatively connecting the fulcrum of the rocking element and the link, a flexible device engaging about said element, said device being in a single length, with its end portions beyond said element diverging, means operatively connected to said opposite brake bands of the automobile, turn buckles connecting said last named means and the extremities of the diverging end portions, and a shield carried by the fulcrum of the element and straddling the element to guard the device engaged about the element, and means carried by the shield and cooperating with the connection between the fulcrum and the link to retain the shield in fixed position relative thereto.

In testimony whereof he affixes his signature.

CHARLES B. KITCHEN.